Patented May 20, 1952

2,597,643

UNITED STATES PATENT OFFICE 2,597,643

MANUFACTURE OF HIGHLY POLYMERIC LINEAR POLYMETHYLENE TEREPHTHALATES IN SOLUTION AND PRECIPITATION THEREOF

Emmette Farr Izard, Kenmore, and Lawrence A. Auspos, Buffalo, N. Y., assignors to E. I. du Pont de Nemours & Company, Wilmington, Del., a corporation of Delaware No Drawing. Application October 31, 1947, Serial No. 783,446

10 Claims. (Cl. 260—75)

This invention relates to the production of synthetic linear condensation polyesters. More particularly it relates to an improved process for preparing highly polymeric linear polymethylene terephthalates directly in comminuted form suitable for molding powder and the like.

In the manufacture of linear superpolymers of polymethylene terephthalates by the now conventional melt polymerization method wherein the condensation is carried out in the melt and under very low pressure, the polyester is obtained in the form of a solid mass which, because of its amorphous character is extremely difficult to grind to a powder suitable for injection or extrusion molding. Consequently it has heretofore been considered that highly polymeric polymethylene terephthalates, even in view of their otherwise superior physical and chemical properties, are not easily obtainable in a physical form adapted for use in the conventional apparatus of the plastics industry.

Therefore, a principal object of this invention is to provide a simple, economical process for preparing linear superpolymers of polymethylene terephthalates in a physical form suitable for use in conventional injection or extrusion molding machines.

Another object is to prepare linear superpolymers of polymethylene terephthalates directly in the form of a fine powder.

Still another object is to prepare linear, highly polymeric polymethylene terephthalates under atmospheric pressure and substantially below the temperature at which the polymers are thermally unstable.

The above and other objects will more clearly appear from the following description.

These objects are realized by our invention which, in brief, comprises polymerizing a partially condensed polymethylene terephthalate, or monomeric polymethylene terephthalate-forming reactants, with or without a catalyst, in solvent media for the polyester product comprising an organic solvent chemically non-reactive with the polyester and ester-forming substances under the conditions of the reaction and having a boiling point not lower than 160° C., to form a highly polymeric linear polymethylene terephthalate having an intrinsic viscosity of at least 0.3, and thereafter precipitating said polymeric polymethylene terephthalate whereby said polymeric polymethylene terephthalate is obtained in the form of a fine powder particularly suited for use in injection and extrusion molding apparatus.

The highly polymeric linear polymethylene terephthalates contemplated by this invention have the recurring structural unit

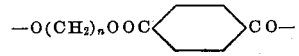

wherein $n$ represents an integer within the range of 2 to 10. The monomeric polymethylene terephthalates to be polymerized in accordance with the principles of this invention may be made by esterifying terephthalic acid with a glycol of the series $HO(CH_2)_nOH$, where $n$ is an integer within the range of 2 to 10. As examples of suitable glycols there may be mentioned ethylene glycol, trimethylene glycol, tetramethylene glycol, pentamethylene glycol, hexamethylene glycol, heptamethylene glycol, octomethylene glycol, nonmethylene glycol and decamethylene glycol. It is preferred to use glycols having from 2 to 4 methylene groups for the reason that they yield highly polymerized esters having very high melting points. Because of its low cost and availability ethylene glycol is specifically preferred. The glycol is used in molecular proportions of from 1 to 5 mols of the glycol per mol of acid. Best results are secured by using an excess of glycol.

Alternatively, the polymethylene terephthalate may be prepared by ester-interchange, i. e., by heating the polymethylene glycol with terephthalic ester-forming derivatives such as low-molecular alkyl esters of terephthalic acid, e. g. methyl, ethyl, propyl butyl, amyl, hexyl or heptyl terephthalates, aryl esters, e. g. those from phenol, cresols, etc., and terephthalic acid dihalides, e. g., terephthalic acid dichloride, terephthalic acid dibromide and terephthalic acid diodide. It is preferred to use methyl or ethyl terephthalates for the reason that the alcohols resulting from the ester interchange have low boiling points and are readily separated from the reaction mixture by distillation. When using the ester interchange method, the time required to form the polymethylene terephthalates may be considerably shortened as compared with the direct method, i. e., esterification of terephthalic acid itself with a glycol.

Any liquid organic solvent capable of dissolving the polymeric polymethylene terephthalates in high concentration (50-90%) at the reaction temperature, which is chemically inert with respect to the remaining ingredients of the reaction mixture and the polyester at the reaction temperature, and which has a boiling point above 160° C., and preferably above 200° C., is suitable for the purposes of this invention. As examples of suitable solvents there may be named, naphthalene, tetrahydronaphthalene, diphenyl, diphenyl methane, diphenyl oxide, acenaphthene, dimethyl naphthalene, or any mixture of these solvents, e. g., the commercially available mixture of diphenyl and diphenyl oxide. In order to facilitate removal of glycol from the reaction zone it is preferred that the inert solvent have a boiling point higher than the glycol employed. However, even a lower boiling solvent assists in the removal of higher boiling glycol by co-distillation.

The concentration of monomeric reactants in the solvent used for polymerization may be varied from 10–90%. The best results, from the standpoint of lower reaction time and high intrinsic viscosity polymers, are obtained, however, when concentrations of 60–80% are used.

The temperature at which the solution polymerization of polymethylene terephthalates may be carried out is dependent on the boiling point of the particular solvent used and the thermal stability of the polyester involved. While polymerization of polymethylene terephthalate can be effectively carried out at temperatures as low as 160° C., polymerization temperatures below 200° C. usually necessitate an excessive length of time to achieve the desired intrinsic viscosity of polyester. The upper temperature limit is governed by the degree of degradation of the polyester at the temperature involved and in general should not exceed 300° C. It is preferred to polymerize the ester within the range of 260–285° C.

In contrast to the melt polymerization process for preparing linear polymers, as heretofore practiced, the entire reaction including the final stage wherein the last traces of glycol are distilled off is carried out at atmospheric pressure. Higher or lower pressures may, of course, be used if desired, but they are in no instance necessary to the process of this invention. Preferably the esterification or ester-interchange, and polymerization is effected in an inert atmosphere, e. g., in the presence of an inert gas such as nitrogen or hydrogen.

The final step of precipitating the highly polymeric linear polymethylene terephthalate formed in solution may be accomplished by any of the usual expedients. For example, where the solvent used as the reaction medium is a non-solvent for the polymer at normal or low temperatures, precipitation is conveniently effected by merely cooling the solution to the temperature at which precipitation of the polymer occurs. Or, if desired, the polymer may be precipitated by diluting the solution with a non-solvent, e. g., by pouring the solution of polymer into a bath of non-solvent such as cold xylene. Precipitation may be followed by the conventional filtering, extracting, washing, drying and like conditioning operations customarily employed in chemical manufacture.

Inasmuch as the molecular weights of condensation polymers are difficult to measure the easily determinable intrinsic viscosities will be used herein as a measure of the degree of polymerization. Intrinsic viscosity is defined as:

$$\text{Limit } \frac{\eta sp}{C} \text{ as } C \text{ approaches zero}$$

where $\eta sp$ is the viscosity of a dilute phenol-tetrachloroethane (60:40) solution of the polyester divided by the viscosity of the phenol-tetrachlorethane mixture per se measured in the same units at the same temperature, and C is the concentration in grams of the polyester per 100 cc. of solution.

The following examples directed to specific embodiments further illustrate, but do not limit the invention. Parts and percentages are by weight unless otherwise indicated.

Example I 20 parts of dimethyl terephthalate, 20 parts of ethylene glycol, and 0.01 part of litharge are placed in a flask equipped with a stirrer and condenser (with a "settling trap" to separate solvent and glycol) and heated at 190° C. in 20 parts of a commercial mixture of diphenyl and diphenyl oxide until 5.26 parts of methyl alcohol distills off. This operation takes place in 3½ hours. The stirred mixture is then heated at 210–220° C. for seven hours under an atmosphere of nitrogen to drive off the glycol (the solvent is recirculated) and finally poured into cold xylene. The precipitated polymer is filtered, extracted with ether in a Soxhlet apparatus for five hours and dried over phosphorous pentoxide. The polymer is obtained in the form of a fine white powder and has an intrinsic viscosity of 0.55.

Instead of recirculating the solvent as in Example I, the solvent may be distilled off with the glycol and fresh solvent added to keep the concentration constant, as described in Example II.

Example II 60 parts of dimethyl terephthalate, 40 parts of glycol, and 0.03 part of litharge are heated at 160–180° C. until the ester exchange is complete, as indicated by the distilling off of 15.8 parts of methyl alcohol. The major portion of the excess glycol is then distilled off and tetrahydronaphthalene added in a calculated amount so that the final polymer would be 70% by weight of the solution. The mixture is refluxed and slowly distilled. Fresh solvent is added at such a rate so that the concentration remains constant. At the end of 15 hours the polymer has the desired intrinsic viscosity. This polymer is precipitated as in Example I by pouring the polymer solution into cold xylene, filtering the precipitated polymer, extracting the same with ether in a Soxhlet apparatus and drying it over phosphorous pentoxide. A polymer in the form of a fine white powder and having an intrinsic viscosity 0.41 is thus obtained.

While this process has been described in the previous examples in terms of preparing the ester and then carrying out the polymerization reaction, it may also be used to raise the intrinsic viscosity of a half-made polyester to obtain a highly polymerized ester as described below.

Example III 80 parts of polyethylene terephthalate of low intrinsic viscosity (0.28) and 20 parts of a commercial mixture of diphenyl and diphenyl oxide are placed in a flask equipped with a mechanical stirrer and reflux condenser (as described in Example I) and heated to 264° C. At the end of 8 hours, the polymer has an intrinsic viscosity of 0.67. This polymer is precipitated as in Example I by pouring the polymer solution into cold xylene, filtering the precipitated polymer, extracting the same with ether in a Soxhlet apparatus and drying it over phosphorus pentoxide.

Example IV

A mixture composed of 80% by weight of polyethylene terephthalate of low intrinsic viscosity (0.28) and 20% of a commercial mixture of diphenyl and diphenyl oxide is heated at 285° C. in an apparatus as described in Example I for 6 hours. A sample of the resultant polymer precipitated as in Example I shows an intrinsic viscosity of 0.72.

The normal role of a solvent in a solution polymerization process, broadly speaking, is that of a convenient medium for carrying out the reaction. While the same purpose is served in the process of this invention, a more important factor is that the solvent reduces the viscosity of the reactants to such a point that the glycol formed in the polymerization is easily distilled off, allowing the formation of a high intrinsic viscosity polymer. In the melt polymerization process, the major portion of the glycol can be distilled off without too much trouble; however, due to the high melt viscosity of the polymer, very low pressures and high temperatures are necessary to remove the residual glycol and allow the formation of a fiber-forming polyester. This invention avoids the necessity for the maintenance of reduced pressure and high temperature conditions of operation.

Furthermore, since, by the process of this invention the polyesters are obtained in the form of a fine powder, they are suitable for injection or extrusion molding operations to form shaped articles without the necessity of having to pass through an intermediate grinding operation.

As many widely different embodiments of this invention may be made without departing from the spirit and scope thereof, it is to be understood that we do not limit ourselves to the specific embodiments thereof in the appended claims.

We claim:

1. In the manufacture of highly polymeric linear polymethylene terephthalates in powder form the steps which comprise polymerizing a polymethylene terephthalate to an intrinsic viscosity of at least 0.3 in an inert organic solvent for the polymeric polymethylene terephthalate said solvent having a boiling point about 160° C., and thereafter precipitating said polymer from solution whereby said polymer is obtained directly in finely divided form suitable for use in injection and extrusion molding apparatus.

2. In the manufacture of highly polymeric linear polymethylene terephthalates in powder form the steps which comprise polymerizing a polymethylene terephthalate at a temperature of from 160° to 300° C. to an intrinsic viscosity of at least 0.3 in an inert organic solvent for the polymeric polymethylene terephthalate said solvent having a boiling point about 160° C., and thereafter precipitating said polymer from solution whereby said polymer is obtained directly in finely divided form suitable for use in injection and extrusion molding apparatus.

3. The process of claim 2 wherein the polymethylene terephthalate in ethylene terephthalate.

4. In the manufacture of highly polymeric linear polymethylene terephthalates in powder form the steps which comprise polymerizing a polymethylene terephthalate at a temperature of from 160° to 300° C., to an intrinsic viscosity of at least 0.3 in solution in an inert organic solvent for the polymeric polymethylene terephthalate, said solvent having a boiling point above 160° C., said solution containing from 10–90% by weight of monomeric reactants, and thereafter precipitating said polymer from solution whereby said polymer is obtained directly in finely divided form suitable for use in injection and extrusion molding apparatus.

5. The process of claim 4 wherein said solution contains from 60–80% by weight of monomeric reactants.

6. The process of claim 5 wherein the polymethylene terephthalate is ethylene terephthalate.

7. The process of claim 6 wherein the polymerization is carried out at a temperature of from 260° to 285° C.

8. The process of claim 7 wherein the solvent is a mixture of diphenyl and diphenyl oxide.

9. The process of claim 8 wherein the solution is diluted with an inert organic non-solvent to precipitate the polymer.

10. The process of claim 9 wherein the non-solvent is xylene.

EMMETTE FARR IZARD.
LAWRENCE A. AUSPOS.

REFERENCES CITED

The following references are of record in the file of this patent:

UNITED STATES PATENTS

| Number | Name | Date |
|---|---|---|
| 2,057,766 | Brubaker | Oct. 20, 1936 |
| 2,335,930 | Freeland et al. | Dec. 7, 1943 |
| 2,465,319 | Whinfield et al. | Mar. 22, 1949 |
| 2,511,544 | Rinke et al. | June 13, 1950 |

FOREIGN PATENTS

| Number | Country | Date |
|---|---|---|
| 578,079 | Great Britain | June 14, 1946 |